(12) United States Patent
Jiao et al.

(10) Patent No.: US 10,162,814 B2
(45) Date of Patent: Dec. 25, 2018

(54) CONVERSATION PROCESSING METHOD, CONVERSATION MANAGEMENT SYSTEM AND COMPUTER DEVICE

(71) Applicant: Baidu Online Network Technology (Beijing) Co., Ltd., Beijing (CN)

(72) Inventors: Zengtao Jiao, Beijing (CN); Guanchun Wang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 15/119,378

(22) PCT Filed: Oct. 21, 2015

(86) PCT No.: PCT/CN2015/092464
§ 371 (c)(1),
(2) Date: Aug. 16, 2016

(87) PCT Pub. No.: WO2016/066035
PCT Pub. Date: May 6, 2016

(65) Prior Publication Data
US 2017/0242843 A1    Aug. 24, 2017

(30) Foreign Application Priority Data
Oct. 29, 2014   (CN) .......................... 2014 1 0593684

(51) Int. Cl.
*G06F 17/27* (2006.01)
*G06F 17/24* (2006.01)
(Continued)

(52) U.S. Cl.
CPC ............ *G06F 17/279* (2013.01); *G06F 3/167* (2013.01); *G06F 9/46* (2013.01); *G06F 9/4881* (2013.01);
(Continued)

(58) Field of Classification Search
CPC ...................................................... G10L 15/22
See application file for complete search history.

(56) References Cited

U.S. PATENT DOCUMENTS 5,659,766 A * 8/1997 Saund ................. G06F 17/3071
704/9
5,778,362 A * 7/1998 Deerwester ....... G06F 17/30634
(Continued)

FOREIGN PATENT DOCUMENTS

AU        2012232977 A1    4/2013
CN        101398810 A      4/2009
(Continued)

OTHER PUBLICATIONS

International Search Report dated Jan. 11, 2016 for International Application No. PCT/CN2015/092464 in 12 pages (English translation in 7 pages).
(Continued)

*Primary Examiner* — Brian L Albertalli
(74) *Attorney, Agent, or Firm* — Knobbe, Martens, Olson & Bear, LLP (57) ABSTRACT

The present invention provides a conversation processing method, a conversation management system and a computer device. The method comprises: acquiring task-related user requirement data; updating a user conversation state based on the user requirement data and a pre-configured task-related task parameter; generating at least one piece of candidate action data according to the user conversation state; and generating response text data according to the at least one piece of candidate action data. The expandability of the conversation management system is improved by customizing the conversion service related to the task in the conversation system.

20 Claims, 5 Drawing Sheets

(51) Int. Cl.
*G06F 3/16* (2006.01)
*G06F 9/48* (2006.01)
*G06F 9/46* (2006.01)

(52) U.S. Cl.
CPC ........ *G06F 17/243* (2013.01); *G06F 17/2705* (2013.01)

(56) References Cited

U.S. PATENT DOCUMENTS

| | | | |
|---|---|---|---|
| 6,233,561 B1 | 5/2001 | Junqua et al. | |
| 6,246,981 B1* | 6/2001 | Papineni | G10L 15/22 704/235 |
| 6,598,018 B1 | 7/2003 | Junqua | |
| 7,016,827 B1* | 3/2006 | Ramaswamy | G10L 15/1822 704/1 |
| 8,457,950 B1* | 6/2013 | Gardner | G10L 15/1815 704/10 |
| 8,548,951 B2* | 10/2013 | Solmer | G06F 17/30073 704/9 |
| 8,707,198 B2 | 4/2014 | Li et al. | |
| 9,378,740 B1* | 6/2016 | Rosen | G10L 15/18 |
| 9,589,565 B2* | 3/2017 | Boies | G10L 17/22 |
| 2002/0038213 A1 | 3/2002 | Adachi | |
| 2004/0148170 A1* | 7/2004 | Acero | G06F 17/2715 704/257 |
| 2006/0009973 A1* | 1/2006 | Nguyen | G10L 15/22 704/257 |
| 2007/0033005 A1 | 2/2007 | Cristo et al. | |
| 2007/0203869 A1 | 8/2007 | Ramsey et al. | |
| 2008/0004864 A1* | 1/2008 | Gabrilovich | G06F 17/27 704/9 |
| 2008/0235017 A1* | 9/2008 | Satomura | G10L 15/22 704/246 |
| 2008/0319748 A1* | 12/2008 | Nakano | G10L 15/22 704/251 |
| 2009/0100045 A1 | 4/2009 | Feng et al. | |
| 2009/0150156 A1 | 6/2009 | Kennewick et al. | |
| 2009/0271350 A1 | 10/2009 | Feng et al. | |
| 2011/0191748 A1 | 8/2011 | Kannan et al. | |
| 2011/0302521 A1 | 12/2011 | Jiang et al. | |
| 2012/0209594 A1* | 8/2012 | Agarwal | H04M 3/4931 704/9 |
| 2014/0136212 A1* | 5/2014 | Kwon | G10L 15/22 704/275 |
| 2014/0229885 A1 | 8/2014 | Jiang et al. | |
| 2014/0278444 A1 | 9/2014 | Larson et al. | |
| 2014/0316782 A1* | 10/2014 | Tzirkel-Hancock | G10L 15/06 704/244 |
| 2015/0032443 A1* | 1/2015 | Karov | G06F 17/2785 704/9 |
| 2015/0142704 A1* | 5/2015 | London | G06N 5/04 706/11 |
| 2015/0178273 A1* | 6/2015 | Hakkani-Tur | G06F 17/28 704/9 |

FOREIGN PATENT DOCUMENTS

| | | |
|---|---|---|
| CN | 102270221 A | 12/2011 |
| CN | 104360897 A | 2/2015 |
| EP | 2 575 128 A2 | 3/2013 |
| JP | 2006039484 | 2/2006 |
| WO | 2014159472 A2 | 10/2014 |

OTHER PUBLICATIONS

International Search Report for Application No. PCT/CN2015/092464 dated Jan. 11, 2016, in 4 pages.
European Search Report dated Oct. 13, 2017 in corresponding Application No. 15855647.2.

* cited by examiner

```
#domain name
type: flight
#URL prefix
url_domain:
rec.baidu.com/travel/ctrip/domestic_flight?
#URL data format
request_slots:dcity=[flight_origin]&acity=[flight_desti
nation]&date=[flight_leave_date]
#json format configuration file
```

FIG. 4

```
# number of MYSQL services
server_num: 1
# data character encoding format
server0_charset: gbk
#access type, temporarily fixed slh
server0_tag: slh
# MYSQL database name
server0_dbname: dialogue_test
# database user name
server0_username: dialogue
#user password corresponding to the user name
server0_password: nlpqa
# MYSQL service port
server0_port: 3306
#IP address of a machine for the MYSQL service
server0_ip: 10.46.132.76
#maximum database read timeout
server0_read_timeout: 1000
maximum database write timeout server0_write_timeout: 1000
```

FIG. 5

```
#slot name
name: flight_origin
#slot value type
type: string
#slot weight
weight: 1
#Chinese slot name
chinese_name: 出发点
#requirement refinement problem
request_pattern: Where would you like to depart from?
What is your origin?
#confirmation problems
confirm_pattern: Do you want to depart from [slot]?
Is [slot] your origin?
#clarification problems
clarify_pattern: Which one is your specific origin?
For example, [slot 0], [slot 1]
#slot value range string: {value file} int/float:[]
range: {flight_origin_range}
#subordinate relation between slots
subordinate:    flight_origin    >    flight_ori_airport
{orignin_airport}
#unequal to relation slot
uneq: flight_destination
#greater than relation slot
bigger:
#smaller than relation slot
smaller:
#arithmetic operation relation
arithmetic_operations:
#trigger new value
```

CONVERSATION PROCESSING METHOD, CONVERSATION MANAGEMENT SYSTEM AND COMPUTER DEVICE

CROSS REFERENCE TO RELATED APPLICATIONS

The present application claims priority to Chinese patent application No. 201410593684.0, filed in the Chinese Patent Office on Oct. 29, 2014, and entitled "Conversation Processing Method and Conversation Management System," the entire contents of which are incorporated herein by reference.

TECHNICAL FIELD

The present invention relates to human-machine interaction of computers, and specifically to a conversation processing method, a conversation management system and computer device.

BACKGROUND

A traditional task-oriented conversation system includes a speech recognition module, a natural language interpreting module, a conversation management module, a back-end data processing module, a natural language generating module and a speech synthesis module. When a specific task-oriented conversation system is constructed, four modules, except the speech recognition module and the speech synthesis module, need customized development based on the specific application task.

Regarding the customized development of tasks, there are mainly two approaches at present:
1. Each module is redeveloped according to the service logic of the specific task. The system customized using this approach can generally meet the requirement of the specific task well, but the effort on the development is large.
2. The conversation system state expression and the system action are abstracted, and a learning reinforcement method is used to construct a conversation system via environmental interaction learning. The system customized using this approach needs a large amount of conversation materials to perfect a conversation strategy and is also relatively difficult to implement, the understandability of the learnt strategy is poor, and the controllability of the system is low.

SUMMARY

An objective of the present invention is to provide a conversation processing technology, which improves the expandability of a conversation management system by customizing the conversion service related to a task in the conversation system.

According to one aspect of the present invention, a conversation processing method is provided, which includes: acquiring task-related user requirement data; updating a user conversation state based on the user requirement data and a pre-configured task-related task parameter; generating at least one piece of candidate action data according to the user conversation state; and generating response text data according to the at least one piece of candidate action data.

According to another aspect of the present invention, a conversation management system is provided, which includes: a requirement acquiring device for acquiring task-related user requirement data; a conversation state updating device for updating a user conversation state based on the user requirement data acquired by the requirement acquiring device and a pre-configured task-related task parameter; an action generating device for generating at least one piece of candidate action data according to the user conversation state updated by the conversation state updating device; and a text generating device for generating response text data according to the at least one piece of candidate action data generated by the action generating device.

According to a further aspect of the present invention, a computer device is provided, which includes: one or more processors; a memory; and one or more programs, the one or more programs being stored in the memory and comprising instructions configured to be executed by the one or more processors to implement a conversation processing method, the method comprising: acquiring task-related user requirement data; updating a user conversation state based on the user requirement data and a pre-configured task-related task parameter; generating at least one piece of candidate action data according to the user conversation state; and generating response text data according to the at least one piece of candidate action data.

According to the conversation processing method, the conversation management system and the computer device of the present invention, the conversation service related to a specific task may be customized in the conversation system, and conversation interaction processing is performed via the customized conversation service based on the conversation management system, so that when the conversation service of a new task is introduced, only conversation state parameters and processing rules need to be configured, and the conversation service does not need to be redeveloped, thereby greatly improving the expandability of the conversation management system, and reducing the research, development and deployment costs.

DETAILED DESCRIPTION OF PREFERRED EMBODIMENTS

The general concept of the present invention is to provide a task related conversation management system. Conversation management related to a specific task is achieved through the task configuration of service logic functional modules related to the specific task, so that conversation customization of a new task may be implemented by using the conversation management system, without redeveloping a conversation service related to the new task, thereby enabling a user to quickly use the customized conversation management system. On the other hand, in conversation interaction processing, a user conversation state may be managed by the conversation management system, and a response text may be generated according to an existing task configuration.

The task configuration mentioned herein includes the parameter configuration of a task related conversation state and a task related service rule configuration.

A conversation processing method, a conversation management system and a computer device of an exemplary embodiment of the present invention will be described in details below in conjunction with the accompanying drawings.

In order to intuitively present the data and rules involved in the present invention and ideas of the present invention, service customization, conversation interaction processing and conversation management are specifically described using only a flight reservation task as an example in the specification. Those of ordinary skill in the art should understand that the present invention is not limited to flight reservation, but also is applicable to various conversation tasks related to multiple rounds of interaction such as restaurant reservation, hotel reservation, cinema ticket reservation, etc.

Figure 1:
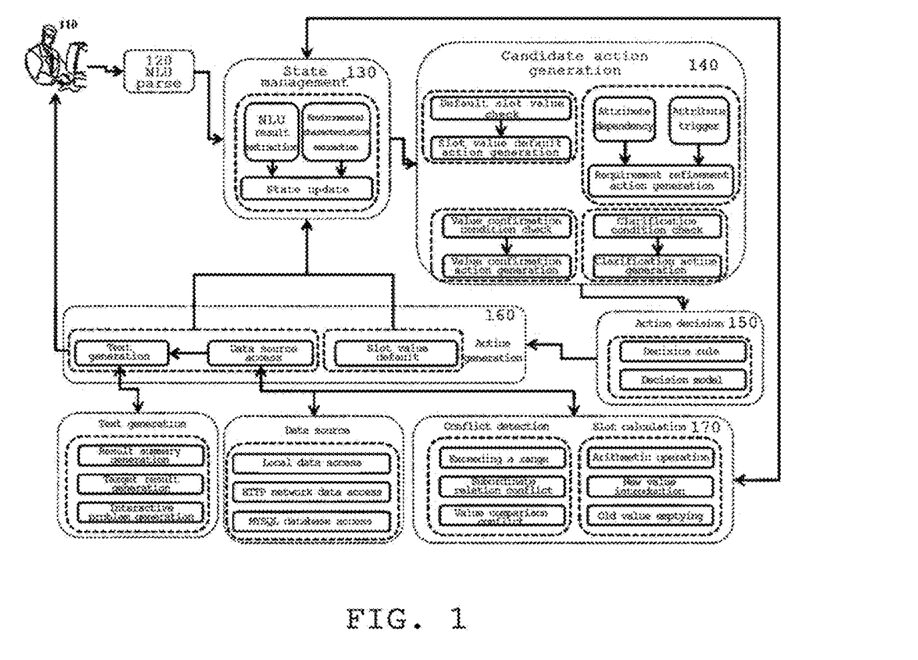
FIG. 1 shows an overall framework of conversation service customization using a conversation management system according to an exemplary embodiment of the present invention.

FIG. 1 shows an overall framework of conversation service customization by a conversation management system according to an exemplary embodiment of the present invention. The conversation service customization of the present invention mainly involves blocks 130-160.

With reference to FIG. 1, block 110 is used for receiving a user requirement text in natural language input by a user. Block 120 is used for obtaining a parse result of the user requirement text by performing natural language parsing thereon.

Thereafter, block 130 is used for updating a user conversation state by combining the parse result with environmental characteristic parameters. This block is mainly used for recording and maintaining the state of the conversation management system.

For example, if a user says "I want to reserve a flight ticket to Shanghai", the user's intention (i.e. task) "flight reservation" may be obtained by natural language parsing of the text. Secondly, environmental information during the conversation, including current time, user location, historical action, etc., is extracted.

During the conversation customization, a slot list for indicating the states of task parameters involved in the task may be preconfigured. For example, when customizing the "flight reservation" service, the involved slots include origin, destination, departure date, departure time, seat category, airplane type, ticket price, airline, origin airport, destination airport, etc. Moreover, task related situation prior information may also be configured, such as time prior information (including month, day of the week, time, etc.), regional prior information (including industrial city or not, tourist area or not, city size and type, etc.) and historical action information (e.g. the number of rounds of interaction from the previous query to the present, the number of rounds of interaction from the previous confirmation to the present, etc.).

Alternatively, multiple slots are used to indicate the states of task related task parameters, and the conversation parameters generated based on the situation prior information are expressed as feature vectors, respectively.

Figure 3:
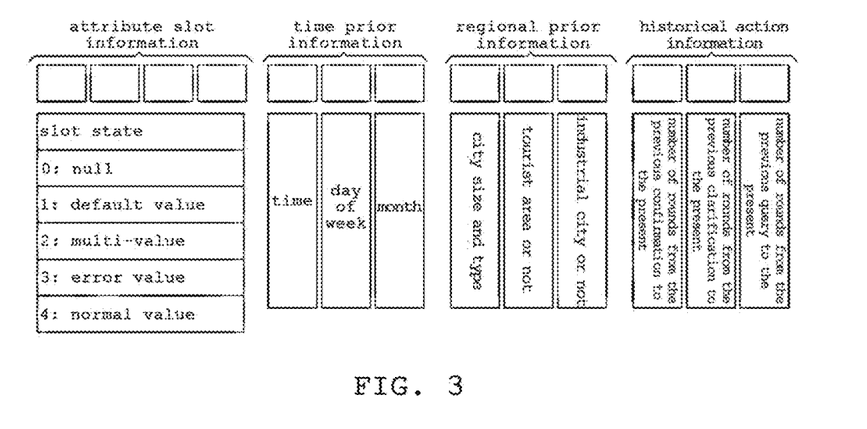
FIG. 3 shows an example of conversation parameters according to an exemplary embodiment of the present invention.

FIG. 3 shows an example of conversation parameters according to an exemplary embodiment of the present invention. A plurality of attribute slots are used to indicate the states of the task parameters, and the state of the slot may be one of null, default value, multi-value, error value and normal value. The time prior information, the regional prior information and the historical action information are expressed as feature vectors.

Next, block 140 is used for checking the updated conversation state and generating at least one piece of candidate action data (140). The primary purpose of the block is to only filter out current effective system actions from all system actions based on the current conversation state, reduce the error rate in the system action decision phase and output a candidate action list.

The check carried out by the block may include, but is not limited to, a slot default value check, a requirement refinement check (including an inter-parameter attribute dependency check and an inter-parameter attribute trigger check), a parameter value confirmation check and a parameter clarification. These above-mentioned checks and the setting of the rules for these checks in the conversation customization will be specifically described below.

Slot Default Value Check

With regard to a specific task, some features/attributes may be set to default values in a certain conversation state, and the default values may be determined from the task customization or user models (e.g. user profiles, interaction history, etc.).

By checking the task customization condition or the user model information, candidate slot value default actions are generated if default values satisfying the condition exist. For example, if a user usually reserves economy class tickets, when a flight reservation conversation is started anew, a slot value default action in which the seat category is "economy class" may be generated.

During the service customization, a developer may carry out default value configuration and user model service configuration for an application task requiring the action, and the default of a configuration means that such an action is not used. The default value configuration includes a target slot, a default value and a default condition. For example, in the flight reservation task, it may configure:
flightflight_leave_date [today] TARGET=flight status
(When querying the flight status, the departure date is set by default as today)

The interface (including an IP address and a port of the service) of the user model service may be configured to check the slot default value by using the user models, e.g.:
user_model_ip:10.81.14.98
user_model_port:6101

Requirement Refinement Check

In order to complete a target task, it needs to actively query the user for necessary characteristic information sometimes.

For example, in order to complete the flight reservation, if the user provides the destination, it needs to query the user for the origin and the departure date. The requirements of the user may be refined by attribute dependency check and attribute trigger check in the current state.

Attribute dependency refers to that the completion of the target task depends on parameters (slots), e.g., a flight ticket query may depend on an origin, a destination and a departure date, the price of the flight ticket may depend on the flight number, seat category, etc., and the application developer may pre-configure the dependency information for convenience. Attribute trigger refers to that for a user having continuous requirements, it needs to actively query parameters (slots) on which next requirement depends in order to complete the next requirement after one requirement is met. For example, in a combined task of a flight ticket and a hotel, after the user finishes the reservation of the flight ticket, the conversation service may try to actively query the user for where he wishes to reserve a hotel at the destination.

During the service customization, the application developer may configure the attribute dependency and the attribute trigger according to the requirements, and the default of a configuration means that such an action is not used. For example, the attribute dependency relation of a flight price query may include:
flightflight_price flight_num| flight_seat_grade
(The flight price depends on the flight number and the seat category)

---
flightflight_price
flight_origin|flight_destination|flight_leave_date|flight_seat_grade
---

(The flight price depends on the origin, the destination, the departure date and the seat category)

The attribute trigger relation:
flight END hotel=hotel_place
(The ticket query ends, triggering a hotel location query)

Parameter Value Confirmation Check

When the confidence of a given received slot value is not very high, the value needs to be confirmed with the user. The parameters to be confirmed include a low-confidence slot value output by the natural language processing, a slot value recommended by the user model, etc.

Thus, whether the current conversation state includes a low-confidence slot or a slot recommended by the user model may be checked. If the low-confidence slot or the slot recommended by the user model is included, candidate action data of the parameter value confirmation is generated.

Parameter Clarification Check

The parameter clarification refers to when the current conversation state is ambiguous, the conversation service actively queries the user for the specific meaning of the involved parameter. Such a problem mainly involves the situation that one value may have multiple meanings or a certain slot may have multiple values. For example, the conversation service queries "What are the origin and destination for the ticket you want to reserve?" and the user answers "Beijing", then Beijing may be the origin or the destination, which requires the user's clarification. For another example, a user says "I want to reserve a ticket to Guangdong", as multiple cities in Guangdong have airports, the user needs to be queried for the specific city.

Thus, in the parameter clarification check, whether the current conversation state of the user includes ambiguous slots or ambiguous values is checked. If ambiguous slots or ambiguous values are included, clarification candidate actions are generated.

Thereafter, preferably, block 150 is further configured to select preferred action data from the at least one piece of candidate action data according to the user conversation state and a decision rule.

In the case that a plurality of pieces of candidate action data are generated in block 140, one of the plurality of pieces of candidate action data may be selected as the determined preferred action data according to the preset decision rule.

The decision rule may be a predetermined action priority or a preset action decision model.

For example, it may be preset that the preferred action is selected according to the following sequence (from high to low priorities): a clarification action, a confirmation action, a slot value default action, and a requirement refinement action (attribute dependency or attribute trigger).

On the other hand, values of feature functions may be calculated for multiple candidate actions by using an action decision model trained with training samples, and the candidate action data for which the calculated value of the feature function is highest is selected as the preferred action data.

Block 160 is used for generating the response text data based on the preferred action data, and returning the response text data to the user. The preferred action determined as a default action may be designated a default value, and a data source is accessed according to the preferred action data to acquire required data so as to generate the response text data.

Here, the data source may be a local data source, an HTTP network data source and/or a database data source.

In the service customization, the developer may select an appropriate data access mode or a combination of multiple access modes according to the requirements of the task and the resource state.

For example, a resource file may be added to the conversation management system in a local file registration mode, that is, one local resource file is registered in each row of the registration file, and an example of the format is as follows:
flight:flight.data
    flight_num|flight_origin|flight_destination| . . .
(Domain name: data file name\t format of each row in the data file)

Figure 4:
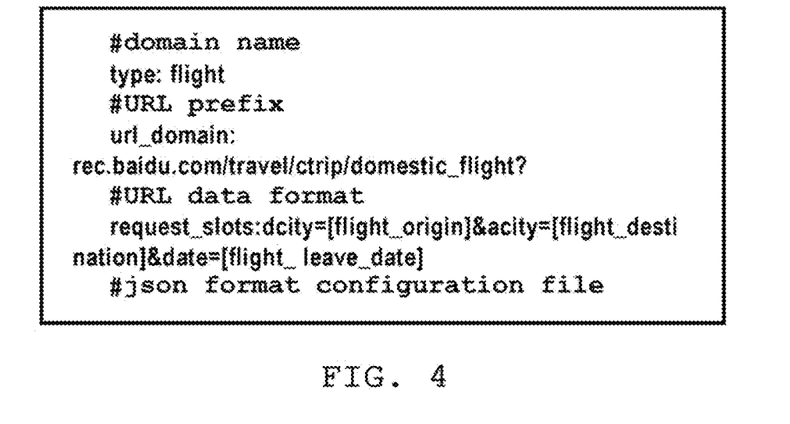
FIG. 4 shows an example of an access configuration of HTTP data access according to an exemplary embodiment of the present invention.
Figure 5:
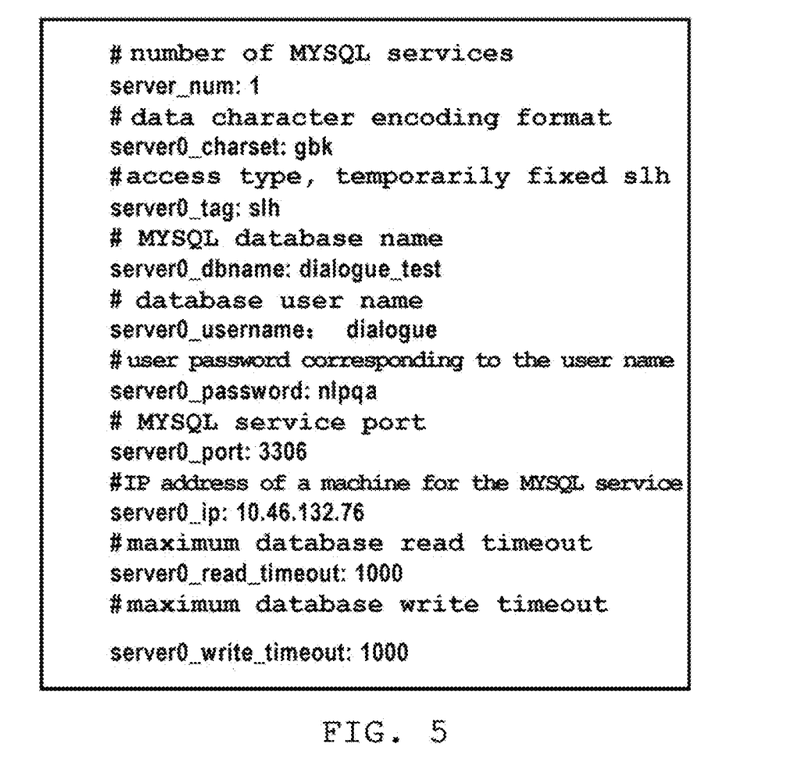
FIG. 5 shows an example of an access configuration of database access according to an exemplary embodiment of the present invention.

Generally only JSON format data return is supported in the access of the HTTP network data source, so the domain name of the HTTP service, the parameter list format and the result JSON data format should be noted in the profiles. For example, FIG. 4 shows an example of access configuration of HTTP data access according to an exemplary embodiment of the present invention. The task type is ticket reservation, the website prefix is url_domain: rec.baidu.com/travel/ctrip/domestic_flight?, the parameter format is dcity=[flight_origin]&acity=[flight_destination]&date=[flig ht_leave_date], and the customized data format is JSON. FIG. 5 shows an example of access configuration of database access according to an exemplary embodiment of the present invention. The detailed description of the data fields in the example of FIG. 5 will be omitted herein.

Moreover, the generated response text data may be a result summary, a target result and/or an interactive question text. The result summary is a summary demonstration of multiple pieces of DATA returned data. For example, 20 flights from Beijing to Shanghai in a day are present in the flight reservation task, and the result summary may summarize the results and demonstrate important information. The target result refers to that an accurate information result representation is generated in the presence of a definite slot requirement. For example, a user asks the price of a cheap flight from Beijing to Shanghai, and then the specific data is given. The interactive question refers to that an active question is generated for the user by the system during the requirement refinement, the value confirmation and the clarification. For example, the system asks the user "When will you leave?", "Do you want to reserve an economy class ticket?', "Which city is your specific destination, such as Guangzhou, Shenzhen, Dongguan, etc.?".

In the overall framework, block 150 may be not deployed, instead the response text data is generated by block 160 based on a piece of generated candidate action data.

In addition, preferably, conflict check and/or value calculation (block 170) may be deployed in the overall framework. Block 170 may be used for conflict check and/or value calculation on conversation state data to be updated in block 2, and/or conflict check and/or value calculation on data derived by data source access in block 160.

Figure 6:
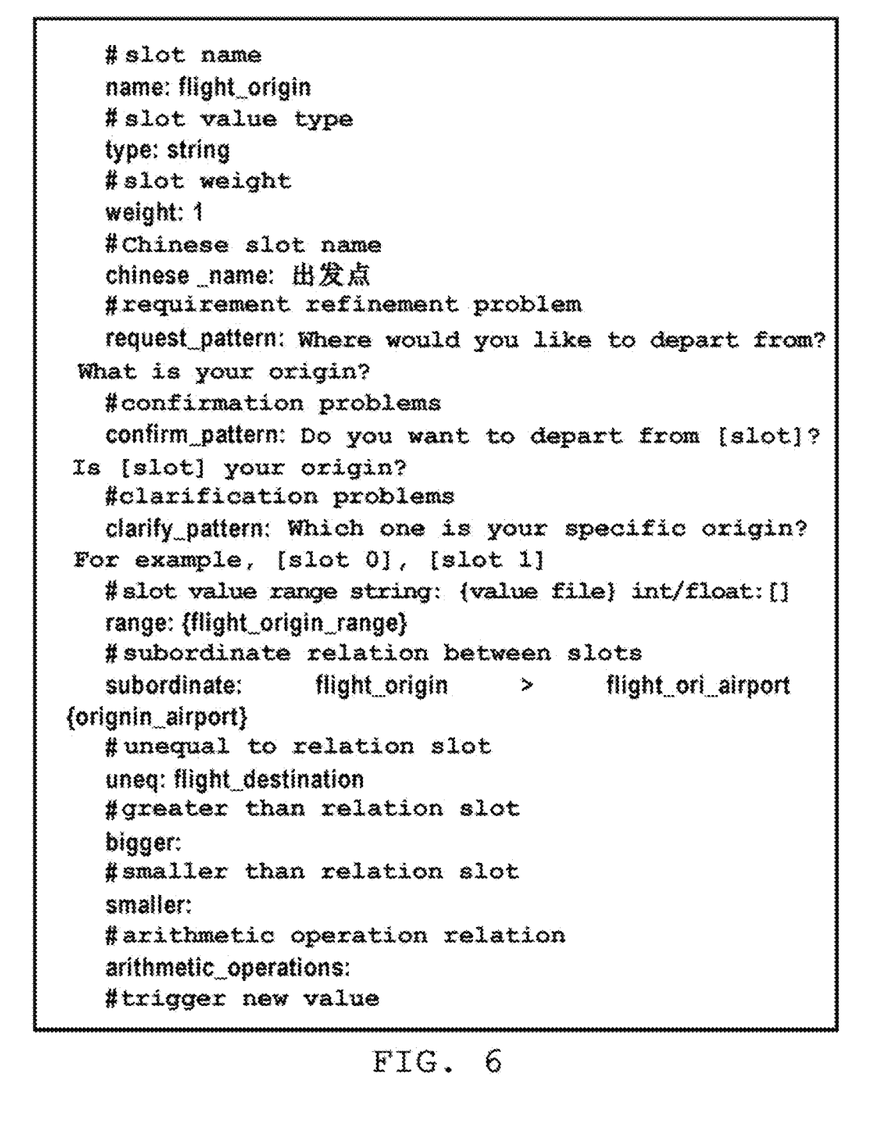
FIG. 6 shows an example of an attribute configuration of conversation parameters according to an exemplary embodiment of the present invention.

The rule setting and customization of the conflict check and/or value calculation will be described below in details with reference to FIG. 6. FIG. 6 shows an example of attribute configuration of conversation parameters according to an exemplary embodiment of the present invention.

At least one of the following data conflicts may be configured in block 170: the value of a conversation parameter exceeding a range, subordinate relation conflict of the conversation parameter and parameter value comparative relation conflict of the conversation parameter.

Exceeding a Range

Exceeding a range refers to the situation where the slot value (feature value) exceeds a predefined value range. For example, in the flight reservation task, a user says "reserve a ticket to Puyang", and thus the destination city exceeds the value range because Puyang in Henan does not have an airport.

The range of each slot may be defined in the service customization. For example, as shown in FIG. 6, the value range of flight_origin (flight origin) is configured in a file flight_origin_range. [ ] is used to indicate data such as integer, floating number (Int, float) type, etc.

Subordinate Relation Conflict

If the values respectively corresponding to two slots having a subordinate relation do not satisfy the subordinate relation, a conflict occurs. For example, a user says "reserve a flight ticket to Beijing" and "go to Hongqiao airport" in two speeches, and because an airport and a city have a subordinate relation, it needs to check whether a conflict exists in the relation between the slot values.

Subordinate relation data between slots may be defined in the service customization. For example, as shown in FIG. 6, "flight_origin>flight_ori_airport" indicates that the origin airport is subordinate to the origin city, and the specific subordinate relation data may be found in a file origin airport.

Parameter Value Comparison Conflict

A fixed comparative relation, e.g., bigger than relation, smaller than relation, unequal to relation, etc., is present between some slots (features). If the values corresponding to specific slots do not satisfy such a relation, a conflict occurs. For example, if a user says "I want to reserve a flight ticket to Shanghai" and says "Leave from Shanghai" in two speeches, a conflict occurs because the origin and the destination cannot be the same.

A comparative relation between slots may be defined in the service customization, including bigger than relation slots, smaller than relation slots, unequal to relation slots, etc. For example, as shown in FIG. 6, "uneq: flight_destination" indicates that "flight_origin (flight origin)" cannot be equal to "flight_destination (flight destination)".

At least one of the following data calculation rules may be further configured in block 170:

Arithmetic Operation

If an arithmetic operation exists between attributes, a new slot value may be calculated based on known values by the arithmetic operation, such as addition, subtraction, multiplication, division, etc. For example, the flight ticket price discount is equal to the current flight ticket price divided by the original flight ticket price. Thus, when the original flight ticket price 1000 Yuan and the current flight ticket price 300 Yuan are learnt, the flight ticket price discount 30% may be obtained by division.

In the service customization, the arithmetic operation (arithmetic_operations) between slots may be defined. For example, as shown in FIG. 6, the discount slot of the flight ticket price may be configured as:
arithmetic_operations:flight_ticket_price/flight_ticket_ori_price.

New Value Introduction

If the value of one slot is completely determined by the value of another slot in a task, then after the dependent slot value is determined, the value of the dependent slot may be updated accordingly. In the flight ticket reservation task example, when the user says he will take Flight 3u8994, the conversation service may directly acquire from the back end that Nanjing is the origin and Chengdu is the destination.

A trigger between slots may be defined in the service customization. For example, as shown in FIG. 6, the flight number slot may be expressed as:
trigger: flight_origin|flight_destination {air_line}

Old Value Emptying

If exclusion occurs between two slot values, and one slot value, after updated, is exclusive from a domain slot value, one of the slot values should be emptied. For example, in a train ticket reservation task, when a user says he wants a hard sleeper", if the historical attributes include a high-speed train type, the train type conflicts with the seat category, and thus one of the attribute value should be emptied.

The exclusion between slots may be defined in the service customization. For example, the seat category slot (train_seat_grade) may be expressed as:
exclusion: train_seat_grade{ticket_seat_map}

The customization of the conversation service related to the specific task in the conversation management system is described in details above with reference to FIG. 1. By adopting the conversation management system, in designing the conversation service of a new task, the conversation service of the task does not need to be redeveloped, and only conversation state parameter and rule related to the new task need to be configured/customized, so that the expandability of the conversation management system is greatly improved, and the research, development and deployment costs are reduced.

A conversation processing method according to an exemplary embodiment of the present invention will be described in details below with reference to FIG. 2.

Figure 2:
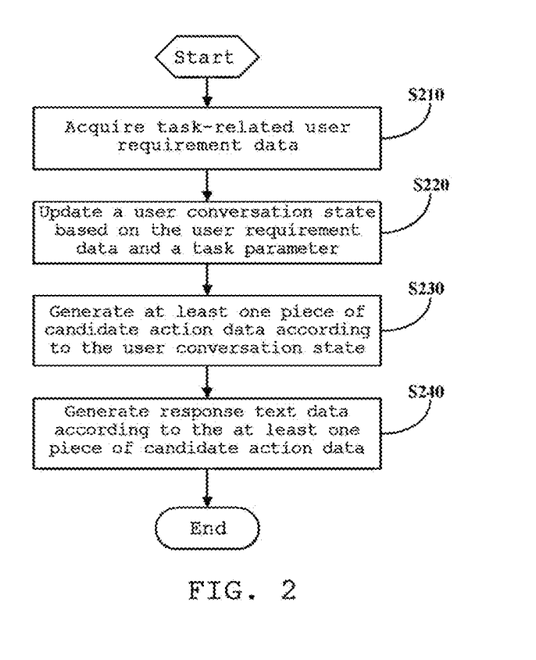
FIG. 2 is a flow chart illustrating a conversation processing method according to an exemplary embodiment of the present invention.

FIG. 2 is a flow diagram illustrating a conversation processing method according to an exemplary embodiment of the present invention. The conversation processing method is executed by the customized blocks 130-160 as shown in FIG. 1.

With reference to FIG. 2, at step S210, task related user requirement data is acquired.

According to the exemplary embodiment of the present invention, the user requirement data includes a parse result obtained by natural language parsing of text data for a user requirement, e.g., a parse result obtained by the natural language parsing processing of block 120 of FIG. 1.

At step S220, a user conversation state is updated based on the user requirement data and a pre-configured task related task parameter.

Because block 130 has been customized as mentioned above, the conversation parameter customized by block 130 may be updated according to the parse result.

Specifically, according to an exemplary embodiment of the present invention, if the parse result indicates the first interaction of a conversation, the pre-configured task related task parameter is acquired according to the parse result, and conversation parameter is generated according to the pre-configured task related task parameter and situation prior information.

According to an alternative embodiment of the present invention, multiple slots are used to indicate a state of the task related task parameter, and the conversation parameter generated based on the situation prior information is expressed as a feature vector.

For example, if the user intention/task of flight reservation is communicated in the first interaction, conversation parameters including the origin, destination, departure date, departure time, seat category, current time, current place, month, day of the week, time, industrial city or not, tourist area or not, city size and type, number of rounds of interaction from the previous query to the present, number of rounds of interaction from the previous clarification to the present and the like are generated based on the customization of block 130, and the conversation parameters are updated based on the data included in the parse result and the environmental information.

Thereafter, at step S230, at least one piece of candidate action data is generated according to the user conversation state.

Specifically, step S230 may include: checking a state of the conversation parameter based on a preset check condition, and generating at least one piece of candidate action data based on a result of the checking.

As mentioned above, multiple check conditions are customized in block 140. The preset check condition may include at least one of the following check conditions: a slot default value check condition, an inter-parameter attribute dependency check condition, an inter-parameter attribute trigger check condition, a parameter value confirmation check condition and a parameter clarification condition.

For example, in the first interaction of the conversation of the flight reservation task, the seat category may be set by default to "economy class"; for another example, in the first interaction of the conversation of the flight reservation task, the ticket query depends on the origin, destination and departure date, and the ticket price depends on the flight number and seat category, so a candidate action for querying the information needs to be generated. As another example, "what are the origin and destination for the ticket you want to reserve" is queried in a previous interaction, the user answers "Beijing", and since Beijing may be the origin or destination, a candidate action for clarifying Beijing is the destination or origin for the user needs to be generated.

At step S240, response text data is generated according to the at least one piece of candidate action data. Herein, the response text data may be generated according to any of the at least one piece of candidate action data. Based on the action type, the generated response text data may be a result summary, a target result and/or an interactive question text.

In the process of generating the response text data, access to a local or external data source may be involved to acquire parameter data required for generating the response text data (e.g., query flight information according to the origin, destination and departure date). According to an exemplary embodiment of the present invention, step S240 may further include: acquiring parameter data required for response from a data source based on the updated conversation parameter and the preferred action data, and generating the response text data based on the acquired parameter data and the preferred action data.

In the process of generating the response text data, a conversation parameter adopting a default value may also be involved, and the default value of the conversation parameter should be filled in accordingly.

According to a preferred embodiment of the present invention, the method may further include: selecting preferred action data from the at least one piece of candidate action data based on the user conversation state and a decision rule. The decision rule may be one of a predetermined action priority and a preset action decision model.

In the event that the decision rule is a preset action decision model, the processing of selecting preferred action data from the at least one piece of candidate action data includes: acquiring a feature function value corresponding to each of the at least one piece of candidate action data based on the action decision model, and selecting the candidate action data corresponding to a maximum of the feature function values as the preferred action data. The action data suitable for the task and for the current conversation state may be determined more accurately by selecting the candidate action with the pre-trained action decision model.

According to the aforementioned preferred embodiment of the present invention, at step S240, response text data is generated based on the preferred action data. Step S240 may include: acquiring parameter data required for response from a data source based on the updated conversation parameter and the preferred action data, and generating the response text data based on the acquired parameter data and the preferred action data. Step S240 may further include: filling in the parameter data with the corresponding default value, if the parameter data required by the preferred action data adopts a default value.

Since block 170 may be further customized in the conversation customization as shown in FIG. 1, according to a preferred embodiment of the present invention, step S220 further includes: performing a data conflict detection on a value of the conversation parameter to be updated, and emptying the value of the updated conversation parameter or sending a message for confirming whether the value of the conversation parameter to be updated is correct, if a data conflict is detected.

The data conflict may include at least one of the following conflicts: the value of the conversation parameter exceeding a range, subordinate relation conflict of the conversation parameter, and parameter value comparative relation conflict of the conversation parameter.

According to another preferred embodiment of the present invention, step S220 further includes: calculating a value of the conversation parameter to be updated, and updating the conversation parameter with the calculated value.

The calculation of the parameter value may include: arithmetic operation of the parameter value, introduction of a new parameter value, emptying the old parameter value, etc. The calculating of parameter value is specifically described with reference to the configuration and customization of block 170 of FIG. 1.

According to another preferred embodiment of the present invention, step S240 may further include: performing a data conflict detection on the acquired parameter data, and discarding the parameter data that has a detected data conflict if the data conflict is detected. Similarly, step S240 may further include: calculating values of the acquired parameter data, and generating the response text data by using the calculated values and the preferred action data.

As can been known from the detailed description of the configuration and customization of multiple blocks of the conversation management system and the conversation processing method of the embodiments of the present invention with reference to FIGS. 1 to 6, the conversation processing method of the present invention may be used for customizing a conversation service related to a specific task in the conversation system and performing conversation interaction processing via the customized conversation service based on the conversation management system, so that when the conversation service of a new task is introduced, only conversation state parameters and processing rules need to be configured and the conversation service does not need to be redeveloped, thereby greatly improving the expandability of the conversation management system and reducing the research, development and deployment costs.

Figure 7:
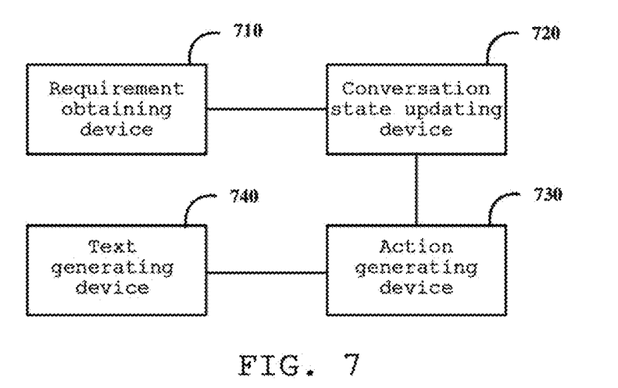
FIG. 7 is a logic block diagram illustrating a conversation management system according to an exemplary embodiment of the present invention.

FIG. 7 is a logic block diagram illustrating a conversation management system according to an exemplary embodiment of the present invention.

With reference to FIG. 7, the conversation management system according to the exemplary embodiment of the present invention includes a requirement acquiring device 710, a conversation state updating device 720, an action generating device 730 and a text generating device 740.

The requirement acquiring device 710 is used for acquiring task-related user requirement data. According to the exemplary embodiment of the present invention, the user requirement data includes a parse result obtained by natural language parsing of text data of a user requirement.

The conversation state updating device 720 is used for updating a user conversation state based on the user requirement data acquired by the requirement acquiring device 710 and a pre-configured task-related task parameter.

According to the exemplary embodiment of the present invention, if the parse result indicates a first interaction of a conversation, the conversation state updating device 720 is used for acquiring the pre-configured task-related task parameter from the parse result, generating a conversation parameter based on the pre-configured task-related task parameter and situation prior information, and updating the conversation parameter according to the parse result.

According to the exemplary embodiment of the present invention, the conversation state updating device 720 is further used for indicating, by multiple slots, a state of the pre-configured task-related task parameter, and expressing the conversation parameter generated based on the situation prior information as a feature vector.

The action generating device 730 is used for generating at least one piece of candidate action data according to the user conversation state updated by the conversation state updating device 720.

Specifically, the action generating device 730 is used for checking a state of the conversation parameter based on a preset check condition, and generating the at least one piece of candidate action data based on a result of the checking.

The preset check condition includes at least one of the following check conditions: a slot default value check condition, an inter-parameter attribute dependency check condition, an inter-parameter attribute trigger check condition, a parameter value confirmation check condition and a parameter clarification condition.

The text generating device 740 is used for generating response text data according to the at least one piece of candidate action data generated by the action generating device 730.

According to a preferred embodiment of the present invention, the system further includes an action decision device (not shown), which is used for selecting preferred action data from the at least one piece of candidate action data based on the user conversation state and a decision rule; and the text generating device 740 is used for generating the response text data based on the preferred action data.

The decision rule may be one of a predetermined action priority and a preset action decision model.

The action decision device is used for acquiring a feature function value corresponding to each of the at least one piece of candidate action data based on the action decision model, and selecting candidate action data corresponding to a maximum of the feature function values as the preferred action data.

According to a preferred embodiment of the present invention, the text generating device 740 is used for acquiring parameter data required for response from a data source based on the updated conversation parameter and the preferred action data, and generating the response text data based on the acquired parameter data and the preferred action data.

According to an optional embodiment of the present invention, if the parameter data required by the preferred action data adopts a default value, the text generating device 740 fills in the parameter data with the corresponding default value.

According to a preferred embodiment of the present invention, the system further includes a data conflict detecting device (not shown). The conversation state updating device 720 and/or the text generating device 740 may perform a data conflict detection via the data conflict detecting device.

The data conflict detecting device detects at least one of the following conflicts: the value of a conversation parameter exceeding a range, subordinate relation conflict of the conversation parameter, and parameter value comparative relation conflict of the conversation parameter.

The data conflict detecting device performs a data conflict detection on the conversation parameter to be updated by the conversation state updating device 720. If a data conflict is detected, the conversation state updating device 720 empties the value of the updated conversation parameter or sends a message for confirming whether the value of the conversation parameter to be updated is correct.

The data conflict detecting device performs a data conflict detection on the parameter data acquired by the text generating device 740. If the data conflict detecting device detects a data conflict, the text generating device 740 discards the parameter data that has the detected data conflict.

According to another preferred embodiment of the present invention, the system further includes a data calculation device (not shown). The conversation state updating device 720 and/or the text generating device 740 may calculate a value of the data via the data calculation device.

The data calculation device calculates a value of the conversation parameter to be updated by the conversation state updating device 720, and the conversation state updating device 720 updates the conversation parameter with the calculated value.

The data calculation device calculates values of the parameter data acquired by the text generating device 740, and the text generating device 740 generates the response text data by using the calculated values and the preferred action data.

As can be known from the detailed description of the configuration and customization of multiple blocks of the conversation management system in the embodiments of the present invention, and the conversation processing method and the conversation management system in the embodiments of the present invention with reference to the accompanying drawings, the conversation processing method and the conversation management system of the present invention may be used for customizing a conversation service related to a specific task in the conversation system and performing conversation interaction processing via the customized conversation service based on the conversation management system, so that when the conversation service of a new task is introduced, only conversation state parameters and processing rules need to be configured, and the conversation service does not need to be redeveloped, thereby greatly improving the expandability of the conversation management system, and reducing the research, development and deployment costs.

Figure 8:
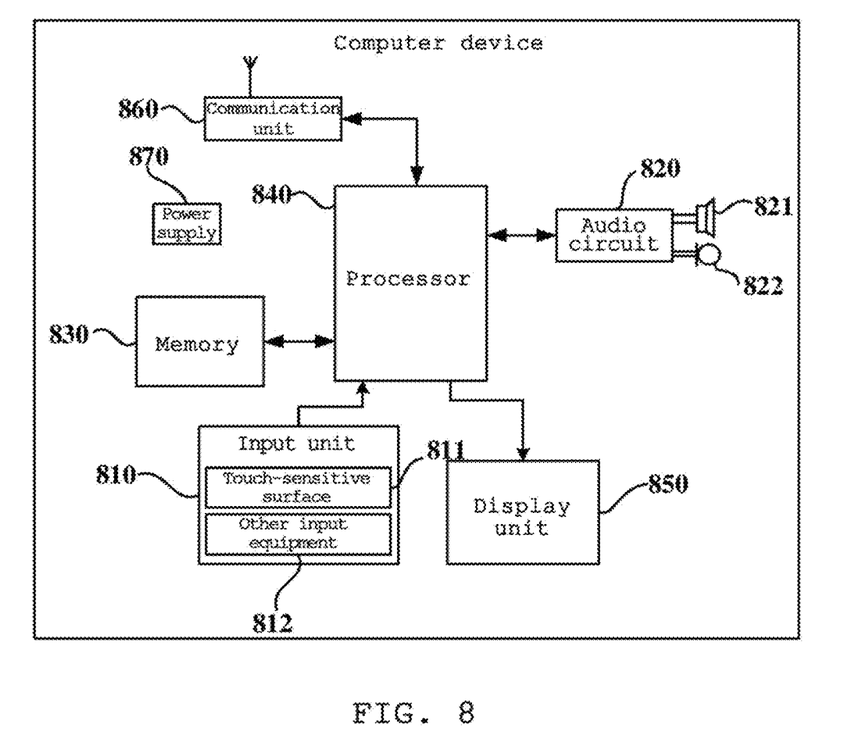
FIG. 8 is a logic block diagram illustrating a computer device according to an exemplary embodiment of the present invention.

FIG. 8 is a logic block diagram illustrating a computer device for conversation management according to an exemplary embodiment of the present invention.

With reference to FIG. 8, the computer device may be used for implementing the conversation processing method provided in the above embodiment.

Specifically, the computer device may include an input unit 810, an audio circuit 820, a memory 830 including one or more computer readable storage medium, a processor 840 including one or more processing cores, a display unit 850, a communication unit 860, a power supply 870, etc. Those skilled in the art should understand that the computer device is not limited to the structure shown in the figure, and may include more or less components than those shown in the figure, or combine some components or have a different component arrangement.

The input unit 810 may be used for receiving input digit or character information, and generating a keyboard, mouse, operating lever, optical or trackball signal input related to a user setting and function control. Preferably, the input unit 810 may include a touch-sensitive surface 811 and other input equipment 812. The touch-sensitive surface 811 is also referred to as a touch display screen or a touch panel, and may collect a user's touch operation thereon or nearby (e.g., a user's operation on the touch-sensitive surface 811 or near the touch-sensitive surface 811 with any appropriate object or accessory such as a finger, or a touch pen) and drive a corresponding connecting device according to the preset program. Alternatively, the touch-sensitive surface 811 may include two parts, i.e., a touch detecting device and a touch controller. The touch detecting device detects the touch position of the user, detects a signal brought by the touch operation and transmits the signal to the touch controller. The touch controller receives touch information from the touch detecting device, converts the touch information into touch coordinates, and transmits the touch coordinates to the processor 840, and may receive a command sent by the processor 840 and execute the command. In addition to the touch-sensitive surface 811, the input unit 810 may include other input equipment 812. Preferably, the other input equipment 812 may include, but is not limited to, one or more of a physical keyboard, a function key (e.g., a volume control key, and a switch key), a trackball, a mouse, an operating lever, etc.

The audio circuit 820, a loudspeaker 821 and a microphone (or mike) 822 may provide audio interfaces between the user and the computer device. The audio circuit 820 may transmit an electrical signal converted from the received audio data to the loudspeaker 821, and the loudspeaker 821 converts the electrical signal into a sound signal for outputting; on the other hand, the microphone 822 converts the collected sound signal into an electrical signal, and the audio circuit 820 receives the electrical signal, converts the electrical signal into audio data and outputs the audio data to the processor 840 for processing. The audio data processed by the processor 840 is sent to, for example, another computer device via the communication unit 860. Alternatively, the audio date is output to the memory 830 for further processing. The audio circuit 820 may further include an earphone jack for providing communication between an external earphone and the computer device.

The memory 830 may be used for storing software programs and data, and the processor 840 performs various functional applications and data processing by executing the software programs and data stored in the memory 830. The memory 830 may mainly include a program storage area and a data storage area, wherein the program storage area may store an operating system, an application program required by at least one function (e.g., sound play function, image display function), etc.; and the data storage area may store data (e.g., audio data, a telephone book) created according to the use of the computer device, etc. Moreover, the memory 830 may include a high-speed random access memory or a nonvolatile memory, e.g., at least one disk storage device, a flash storage device or other nonvolatile solid-state storage device. Correspondingly, the memory 830 may further include a memory controller for providing access of the processor 840 and the input unit 810 to the memory 830.

The processor 840 is a control center of the computer device, connects all parts of the whole computer device by using various interfaces and circuits, and performs various functions of the computer device and processes data by running or executing the software programs and/or modules stored in the memory 830 and calling the data stored in the memory 830, thus comprehensively monitoring the computer device.

The display unit 850 may be used for displaying information input by the user, information provided to the user or various graphic user interfaces of the computer device, wherein the graphic user interfaces may be composed of graphs, texts, icons, videos and any combination thereof. The display unit 850 may include a display panel, and optionally, the display panel may be configured in the form of LCD (Liquid Crystal Display), OLED (Organic Light-Emitting Diode), etc. Although the input unit 810 and the display unit 850 are used as two independent components in the figure to achieve the input and output functions, the input unit 810 and the display unit 850 may be integrated to achieve the input and output functions in certain embodiments.

The communication unit 860 may be used for receiving and transmitting signals in the information transceiving or communication process, and the communication unit 860 may be a network communication device such as a RF (Radio Frequency) circuit, a router or a modem. Moreover, the communication unit 860 may also communicate with a network and other equipment via wireless communication. The wireless communication may adopt any communication standard or protocol, including but not limited to GSM (Global System of Mobile communication), GPRS (General Packet Radio Service), CDMA (Code Division Multiple Access), WCDMA (Wideband Code Division Multiple Access), LTE (Long Term Evolution), E-mails, SMS (Short Messaging Service), etc.

The computer device may further include a power supply 870 (e.g., a battery) for supplying power to each component. Preferably, the power supply may be logically connected with the processor 840 via a power management system, thus implementing the functions of managing charge, discharge, power consumption and the like via the power management system. The power supply 870 may further include one or more of a direct-current or alternating-current power supply, a rechargeable system, a power supply failure detecting circuit, a power converter, an inverter, a power state indicator and the like.

Although not shown, the computer device may further include a camera, a Bluetooth module, sensors (e.g., optical sensors, motion sensors and other sensors, etc.), an audio circuit, a wireless communication unit and the like, description of which are omitted herein.

In this embodiment, the computer device includes one or more processors 840, a memory 830, and one or more programs, the one or more programs being stored in the memory 830 and configured to be executed by the one or more processors 840 to implement a conversation processing method, the method comprising: acquiring task-related user requirement data; updating a user conversation state based on the user requirement data and a pre-configured task-related task parameter; generating at least one piece of candidate action data according to the user conversation state; and generating response text data according to the at least one piece of candidate action data.

Moreover, the user requirement data includes a parse result obtained by natural language parsing of text data of a user requirement.

Further, the step of updating a user conversation state based on the user requirement data and a pre-configured task-related task parameter includes: if the parse result indicates a first interaction of a conversation, acquiring the pre-configured task-related task parameter based on the parse result, generating a conversation parameter based on the pre-configured task-related task parameter and situation prior information, and updating the conversation parameter according to the parse result.

Moreover, multiple slots are used to indicate a state of the task-related task parameter, and the conversation parameter generated based on the situation prior information is expressed as a feature vector.

Further, the step of generating at least one piece of candidate action data according to the user conversation state includes: checking a state of the conversation parameter based on a preset check condition, and generating at least one piece of candidate action data based on a result of the checking.

Moreover, the preset check condition includes a slot default value check condition, an inter-parameter attribute dependency check condition, an inter-parameter attribute trigger check condition, a parameter value confirmation check condition and a parameter clarification condition.

Further, the memory 830 further includes instructions for executing the following processing: selecting preferred action data from the at least one piece of candidate action data based on the user conversation state and a decision rule; and the step of generating the response text data according to the at least one piece of candidate action data includes: generating the response text data based on the preferred action data.

Moreover, the decision rule is one of a predetermined action priority and a preset action decision model, wherein the processing of selecting the preferred action data from the at least one piece of candidate action data includes: acquiring a feature function value corresponding to each of the at least one piece of candidate action data based on the action decision model, and selecting candidate action data corresponding to a maximum of the feature function values as the preferred action data.

Moreover, the processing of generating the response text data based on the preferred action data includes: acquiring parameter data required for response from a data source based on the updated conversation parameter and the preferred action data, and generating the response text data based on the acquired parameter data and the preferred action data.

Moreover, the processing of generating the response text data based on the preferred action data further includes: if the parameter data required by the preferred action data adopts a default value, filling in the parameter data with the corresponding default value.

Moreover, the processing of updating the conversation parameter according to the parse result further includes: performing a data conflict detection on a value of the conversation parameter to be updated, and if a data conflict is detected, emptying the value of the updated conversation parameter or sending a message for confirming whether the value of the conversation parameter to be updated is correct.

Moreover, the data conflict includes at least one of the following conflicts: the value of the conversation parameter exceeding a range, subordinate relation conflict of the conversation parameter, and parameter value comparative relation conflict of the conversation parameter.

Moreover, the processing of updating the conversation parameter according to the parse result further includes: calculating a value of the conversation parameter to be updated, and updating the conversation parameter with the calculated value.

Moreover, the processing of generating the response text data based on the acquired parameter data and the preferred action data further includes: performing a data conflict detection on the acquired parameter data, and if a data conflict is detected, discarding the parameter data that has the detected data conflict.

Moreover, the processing of generating the response text data based on the acquired parameter data and the preferred action data further includes: calculating values of the acquired parameter data, and generating the response text data by using the calculated values and the preferred action data.

As can been known from the detailed description of the configuration and customization of the computer device in the embodiment of the present invention, and the conversation processing method, and the conversation management system and the computer device in the embodiments of the present invention with reference to the accompanying drawings, the conversation processing method, the conversation management system and the computer device of the present invention may be used for customizing a conversation service related to a specific task in the conversation system and performing conversation interaction processing via the customized conversation service based on the conversation management system, so that when the conversation service of a new task is introduced, only conversation state parameters and processing rules need to be configured, and the conversation service does not need to be redeveloped, thereby greatly improving the expandability of the conversation management system, and reducing the research, development and deployment costs.

It should be noted that according to the implementation requirements, each step described in the present application may be split into more steps, and two or more steps or part of operations of a step may also be combined into a new step, to achieve the object of the present invention.

The above-mentioned method according to the present invention may be implemented in hardware or firmware, or implemented as software or computer codes which may be stored in a recording medium (such as a CD ROM, a RAM, a floppy disk, a hard disk or a magneto-optical disc), or implemented as computer codes which are downloaded via a network and originally stored in a remote recording medium or a non-transient machine readable medium and will be stored in a local recording medium, so that the method described herein may be processed by such software stored in the recording medium using a general computer, a dedicated processor or programmable or dedicated hardware (such as ASIC or FPGA). It should be understood that the computer, the processor, the microprocessor controller or the programmable hardware includes a storage component (e.g., an RAM, an ROM and a flash memory) which may store or receive software or computer codes, and when the software or computer codes are accessed and executed by the computer, the processor or the hardware, the processing method described herein is implemented. Moreover, when the general computer accesses the codes for implementing the processing shown here, the execution of the codes converts the general computer to a dedicated computer for executing the processing shown here.

Described above are merely exemplary embodiments of the present invention, but the protection scope of the present invention is not limited thereto. Any variations or substitutions readily conceivable to those skilled in the art within the disclosed technical scope of the present invention shall fall into the protection scope of the present invention. Accordingly, the protection scope of the present invention is defined by the protection scope of the claims.

What is claimed is:

1. A conversation processing method, comprising:
   acquiring task-related user requirement data;
   updating a user conversation state based on the user requirement data and a pre-configured task-related task parameter, the pre-configured task-related task parameter comprising multiple slots to indicate states of task parameters;
   generating at least one piece of candidate action data according to the user conversation state; and
   generating response text data according to the at least one piece of candidate action data,
   wherein the user requirement data comprises a parse result obtained by natural language parsing of text data of a user requirement,
   wherein the updating the user conversation state based on the user requirement data and the pre-configured task-related task parameter comprises:
      assigning a default or a null value to the multiple slots of the pre-configured task-related task parameter based on the parse result, wherein the default value is determined from a task customization condition or a user model information;
      generating a conversation parameter based on the pre-configured task-related task parameter and situation prior information; and
      updating the conversation parameter according to the parse result, and
   wherein generating the at least one piece of candidate action data according to the user conversation state comprises:
      checking whether the user conversation state includes an ambiguous slot or an ambiguous value; and
      generating a clarification candidate action in response to determining that an ambiguous slot or an ambiguous value is included in the user conversation state.

2. The method of claim 1, wherein the conversation parameter generated based on the situation prior information is expressed as a feature vector.

3. The method of claim 1, wherein the generating the at least one piece of candidate action data according to the user conversation state comprises:
   checking a state of the conversation parameter according to a preset check condition, and
   generating the at least one piece of candidate action data based on a result of the checking.

4. The method of claim 3, wherein the preset check condition comprises a slot default value check condition, an inter-parameter attribute dependency check condition, an inter-parameter attribute trigger check condition, a parameter value confirmation check condition and a parameter clarification condition.

5. The method of claim 1, wherein the method further comprises:
   selecting preferred action data from the at least one piece of candidate action data based on the user conversation state and a decision rule, and
   the generating the response text data based on the at least one piece of candidate action data comprises: generating the response text data based on the preferred action data.

6. The method of claim 5, wherein the decision rule is one of a predetermined action priority and a preset action decision model, and
   the selecting the preferred action data from the at least one piece of candidate action data comprises:
      acquiring a feature function value corresponding to each of the at least one piece of candidate action data based on the action decision model, and
      selecting candidate action data corresponding to a maximum of the feature function values as the preferred action data.

7. The method of claim 5, wherein the generating the response text data based on the preferred action data comprises:
   acquiring parameter data required for response from a data source based on the updated conversation parameter and the preferred action data; and
   generating the response text data based on the acquired parameter data and the preferred action data.

8. The method of claim 7, wherein the generating the response text data based on the preferred action data further comprises:
   if the parameter data required by the preferred action data adopts a default value, filling in the parameter data with the corresponding default value.

9. The method of claim 1, wherein the updating the conversation parameter according to the parse result further comprises:
   performing a data conflict detection on a value of the conversation parameter to be updated, and
   emptying the value of the updated conversation parameter or sending a message for confirming whether the value of the conversation parameter to be updated is correct in response to a data conflict being detected.

10. The method of claim 9, wherein the data conflict comprises at least one of: the value of the conversation parameter exceeding a range, subordinate relation conflict of the conversation parameter, and parameter value comparative relation conflict of the conversation parameter.

11. The method of claim 1, wherein the updating the conversation parameter based on the parse result further comprises:
   calculating a value of the conversation parameter to be updated; and updating the conversation parameter with the calculated value.

12. The method of claim 7, wherein the generating the response text data based on the acquired parameter data and the preferred action data further comprises:
   performing a data conflict detection on the acquired parameter data; and
   if a data conflict is detected, discarding the parameter data that has the detected data conflict.

13. The method of claim 7, wherein the generating the response text data based on the acquired parameter data and the preferred action data further comprises:
   calculating values of the acquired parameter data; and
   generating the response text data by using the calculated values and the preferred action data.

14. A conversation management system, comprising:
   a requirement acquiring device for acquiring task-related user requirement data;
   a conversation state updating device for updating a user conversation state based on the user requirement data acquired by the requirement acquiring device and a pre-configured task-related task parameter, the pre-configured task-related task parameter comprising multiple slots to indicate states of task parameters;
   an action generating device for generating at least one piece of candidate action data according to the user conversation state updated by the conversation state updating device; and
   a text generating device for generating response text data according to the at least one piece of candidate action data generated by the action generating device,
   wherein the user requirement data comprises a parse result obtained by natural language parsing of text data of a user requirement,
   wherein the conversation state updating device is configured to:
      assign a default or a null value to the multiple slots of the pre-configured task-related task parameter based on the parse result, wherein the default value is determined from a task customization condition or a user model information;
      generate a conversation parameter based on the pre-configured task-related task parameter and situation prior information; and
      update the conversation parameter according to the parse result, and
   wherein the action generating device is configured to:
      check whether the user conversation state includes an ambiguous slot or an ambiguous value, and
      generate a clarification candidate action in response to determining that an ambiguous slot or an ambiguous value is included in the user conversation state.

15. The system of claim 14, wherein the conversation state updating device is further configured to express the conversation parameter generated based on the situation prior information as a feature vector.

16. The system of claim 14, wherein the action generating device is configured for checking a state of the conversation parameter based on a preset check condition, and generating the at least one piece of candidate action data based on a result of the checking.

17. The system of claim 16, wherein the preset check condition comprises a slot default value check condition, an inter-parameter attribute dependency check condition, an inter-parameter attribute trigger check condition, a parameter value confirmation check condition and a parameter clarification condition.

18. The system of claim 14, wherein the system further comprises an action decision device, which is configured for
   selecting preferred action data from the at least one piece of candidate action data based on the user conversation state and a decision rule, and
   the text generating device is configured for generating the response text data based on the preferred action data.

19. The system of claim 18, wherein
   the decision rule is one of a predetermined action priority and a preset action decision model, and
   the action decision device is configured for acquiring a feature function value corresponding to each of the at least one piece of candidate action data based on the action decision model, and selecting candidate action data corresponding to a maximum of the feature function values as the preferred action data.

20. A computer device, comprising:
one or more processors;
a memory; and
one or more programs, the one or more programs being stored in the memory and comprising instructions configured to be executed by the one or more processors to implement a conversation processing method, the method comprising:
   acquiring task-related user requirement data;
   updating a user conversation state based on the user requirement data and a pre-configured task-related task parameter, the pre-configured task-related task parameter comprising multiple slots to indicate states of task parameters;
   generating at least one piece of candidate action data according to the user conversation state; and
   generating response text data according to the at least one piece of candidate action data,
   wherein the user requirement data comprises a parse result obtained by natural language parsing of text data of a user requirement,
   wherein the updating the user conversation state based on the user requirement data and the pre-configured task-related task parameter comprises:
      assigning a default or a null value to the multiple slots of the pre-configured task-related task parameter based on the parse result, wherein the default value is determined from a task customization condition or a user model information;
      generating a conversation parameter based on the pre-configured task-related task parameter and situation prior information; and
      updating the conversation parameter according to the parse result, and
   wherein generating the at least one piece of candidate action data according to the user conversation state comprises:
      checking whether the user conversation state includes an ambiguous slot or an ambiguous value; and
      generating a clarification candidate action in response to a determination that an ambiguous slot or an ambiguous value is included in the user conversation state.

* * * * *